United States Patent [19]
Fletcher et al.

[11] 3,802,660
[45] Apr. 9, 1974

[54] FLOW CONTROL VALVE

[76] Inventors: James C. Fletcher, Administrator of the National Aeronautics and Space Administration with respect to an invention of; Lance G. Hays, La Crescenta, Calif.

[22] Filed: Sept. 7, 1972

[21] Appl. No.: 287,150

[52] U.S. Cl............ 251/120, 137/628, 251/122, 251/210
[51] Int. Cl............................................ F16k 47/16
[58] Field of Search .......... 251/118, 120, 121, 122, 251/205, 210, 333, 170, 172; 137/628, 630.19, 516.27, 516.29

[56] References Cited
UNITED STATES PATENTS

| 2,866,477 | 12/1958 | Bredtschneider et al. .......... 137/628 |
| 3,482,415 | 12/1969 | Trask ............................... 251/121 X |
| 1,844,164 | 2/1932 | Jewett .............................. 137/628 |
| 2,645,449 | 7/1953 | Gulick .............................. 251/210 |
| 2,151,442 | 3/1939 | Roberts et al. .................... 251/172 |
| 2,635,622 | 4/1953 | Owens ............................. 251/120 X |
| 3,583,426 | 6/1971 | Feres ............................... 137/240 |

*Primary Examiner*—Alan Cohan
*Assistant Examiner*—Gerald A. Michalsky
*Attorney, Agent, or Firm*—Monte F. Mott; John R. Manning; Wilfred Grifka

[57] ABSTRACT

A flow control valve for high-temperature fluids. The valve is characterized by an all-metal flow control unit including a tubular conduit, terminating in a valve seat, a throttling cone having an internal, truncated conical surface coaxially related to the valve seat and supported for axial motion relative to the seat, and an axially reciprocable, flow-control plug supported in coaxial relation with the cone. The plug is provided with a truncated conical surface configured to be mated with the surface of the throttling cone for regulating a flow of fluid established through the unit and a curved shut-off surface disposed at the distal end of the plug for engaging the valve seat whereby an interruption of the flow of fluid is achieved.

7 Claims, 3 Drawing Figures

FLOW CONTROL VALVE

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The invention relates to flow control valves, and more particularly to an improved valve having a low-pressure drop characteristic and possessing both throttling and shut-off capabilities for precisely controlling flows of high-temperature fluids.

2. Description of the Prior Art

The prior art is replete with flow control valves. Many of the known valves have combined throttling and shut-off capabilities. Illustrative of these valves is the valve disclosed in U.S. Pat. No. 2,866,477.

For reasons which are readily apparent, it is desirable to impart to a valve a leak-tight shut-off capability, when the valve is in an "off" configuration, a precise throttling capability, when the valve is in a throttling configuration, and low-pressure drop, when the valve is in a full-flow configuration. Currently available valves simply lack this combination of capabilities.

For example, when working with heated fluids, it is particularly difficult to achieve precise throttle control due to temperature-induced changes in the dimensions of valve components. Furthermore, any use of deformable valve seats or plugs, in order to compensate for such changes, is inhibited due to the working temperatures of the fluids. Of course, various attempts have been made to fabricate valves from high-temperature steel materials. Valves so fabricated heretofore have not met existing needs, particularly where a leak-tight shut-off capability is required, due primarily to the fact that the surfaces of the valve seat and the mating valve plug are quite hard and, as a consequence, error in the alignment of the plug relative to the seat inhibits an establishment of a leak-tight seal therebetween. A lack of a leak-tight seal becomes even more significant where the shut-off plug and seat are arranged within a throat designed to establish a low-pressure drop across the valve, since the plug normally is required to seat against system pressure.

Accordingly, it is the purpose of the instant invention to provide an improved flow control valve having the combined capabilities for a leak-tight shut-off and a fine throttling control characteristic, while simultaneously providing for a low-pressure drop.

OBJECTS AND SUMMARY OF THE INVENTION

It is therefore an object of the instant invention to provide an improved flow control valve.

It is another object to provide a practical and efficient flow control valve fabricated from a refractory metal, simple in design and economic to fabricate.

Another object is to provide an improved flow control valve fabricated from refractory metals for use in controlling the flow of high-temperature fluids.

It is another object to provide a flow control valve formed of refractory metals having a capability for achieving leak-tight shut-off, fine throttling, and particularly suited for use in a system wherein a valve having a low-pressure drop characteristic is desired.

It is another object to provide in a flow control valve a flow control unit fabricated from refractory metal and including a conduit having defined at one end thereof an annular seat for receiving in sealing engagement a cooperating sealing surface of a hemispherical configuration provided for a flow control plug, and a coaxially aligned throttling cone spaced from the conduit and movable with respect thereto.

It is another object to provide in a flow control valve a flow control unit having a tubular circuit including a valve seat defined about one end of the conduit, a throttling cone coaxially related to the valve seat and supported for axial movement with respect thereto, the reciprocable plug being supported in coaxially relation with the cone and including a throttling surface of a truncated conical configuration and a shut-off surface extensible through the cone into sealing engagement with the valve seat for thereby accommodating fine throttling and achieving a leak-tight shut-off for the valve.

It is another object to provide an improved flow control valve operable through a range of configurations extending from a substantially leak-tight shut-off configuration through a fine throttling configuration to a substantially full-flow configuration wherein a relatively low-pressure drop across the valve is experienced.

These and other objects and advantages are achieved through the use of a flow control unit formed of refractory metal including a tubular conduit terminating in a valve seat, a throttle cone having an internal throttling surface of a truncated conical configuration coaxially related to the seat and supported for relative movement in axial directions, and a reciprocable valve plug supported in coaxial relation with the throttle cone including a throttling surface of a truncated conical configuration circumscribing an end portion thereof configured to be received within the throttling surface of the cone for regulating a flow of fluid, established therethrough, and a terminal hemispherical sealing surface formed at its distal end adapted to be passed through the cone into sealing engagement with the valve seat for interrupting a flow of fluid through the unit. The throttling surfaces are commonly oriented at a slight angle relative to the longitudinal axis of the plug so that substantial displacement of the plug is required to effect slight perpendicular displacement of the throttling surfaces for achieving fine throttling. The resulting effects of misalignment inadvertently introduced between the adjacent throttling surfaces are readily avoided through an inclusion of a flexible diaphragm employed as a resilient support for the cone, whereby both fine throttling and positive shut-off are facilitated. Furthermore, an annular array of uniformly configured slots are formed in the cone for accommodating a large increase in the volume through the cone when the plug is sufficiently displaced. The foregoing will become more readily apparent by reference to the following description and claims in light of the accompanying drawings.

DESCRIPTION OF THE PREFERRRED EMBODIMENT

Figure 1:
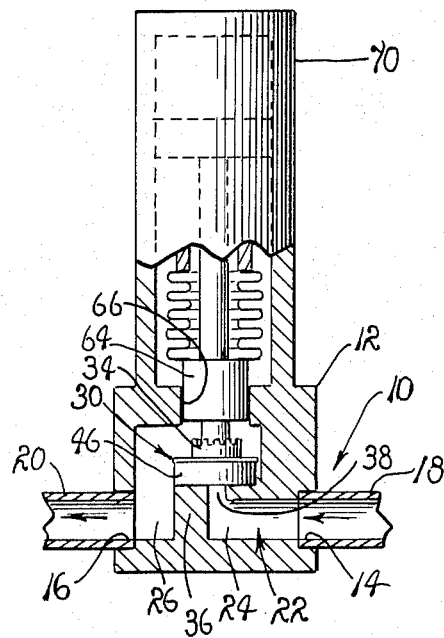
FIG. 1 is a partially sectioned view of a flow control valve which embodies the principles of the instant invention.
Figure 2:
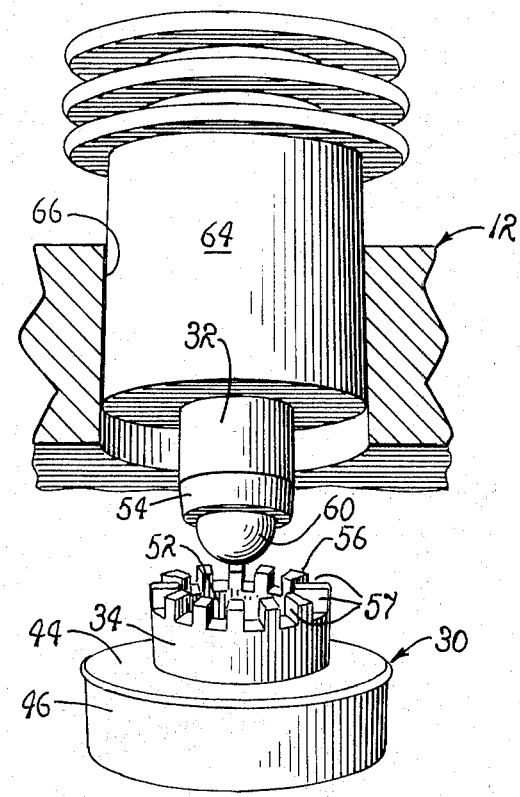
FIG. 2 is a partially exploded, perspective view of a flow control unit employed by the valve shown in FIG. 1.

Referring now to the drawings wherein like reference characters designate like or corresponding parts throughout the several views, there is shown in FIG. 1 a flow control valve, generally designated 10, embodying the principles of the instant invention.

As shown in FIG. 1, the valve 10 includes a valve housing 12 having a inlet port 14 and a discharge port 16. Coupled in feeding relationship with the inlet port 14 is an inlet conduit 18 which delivers a flowing body to fluid to the housing 12, while a discharge conduit 20 is provided at the discharge port 16 for conducting the flowing body away from the housing 12. Thus, the conduits 18 and 20 serve to deliver a flow of fluid to and from the valve 10 and therefore are fabricated from any suitable material and united with the housing 12 in any manner desired and as dictated by the intended use of the valve.

As a practical matter, the valve 10 has particular utility in controlling a flow of high-temperature cesium. Accordingly, the housing 12 preferably is fabricated from a suitable refractory material such as a ceramic or stainless steel.

Within the housing 12 there is defined a passageway, generally designated 22, which extends between the inlet port 14 and the discharge port 16. As a practical matter, the passageway 22 is a segmented passageway having an inlet segment, designated 24, defining an inlet passageway for the valve, and a discharge segment, designated 26. Hence, it is to be understood that the fluid delivered to the valve 10 is conducted through the valve housing 12 by the passageway 22.

Interposed between the segments 24 and 26 of the passageway 22, there is a flow control unit, generally designated 30, also formed of a refractory material such as stainless steel. The flow control unit includes an axially reciprocable plug 32, a throttle cone 34 and a flow control block 36. Extended vertically through the block 36 is a bore 38 coaxially related to the throttle cone 34 and plug 32. As a practical matter, the block 36 includes a riser 40 through which the bore 38 is extended. The riser 40 serves to support, in circumscribing relationship, an annular base of the throttle cone 34, designated 42, provided with a cylindrical bore 43, the diameter of which approximates the outside diameter of the riser 40.

Figure 3:
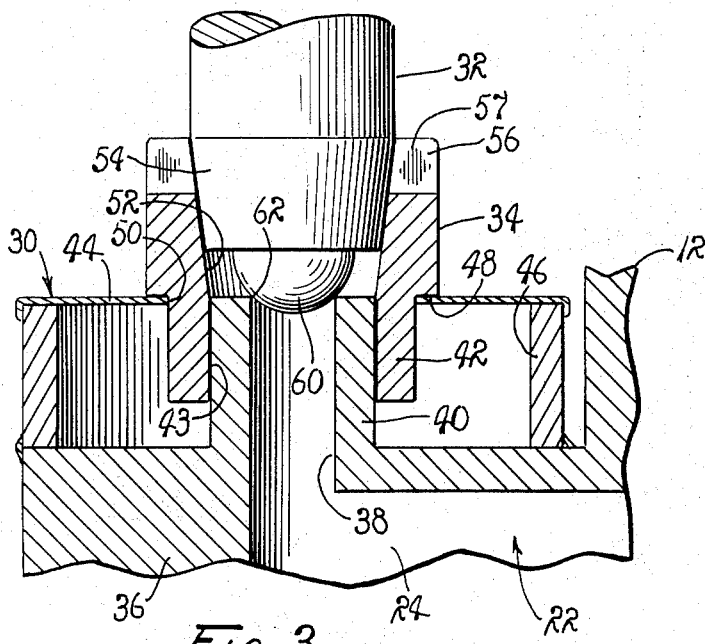
FIG. 3 is a partially sectioned, fragmentary view of the flow control unit shown in FIG. 2.

The throttle cone 34 is supported for vertical motion, relative to the riser 40, by a flexible, disk-shaped diaphragm 44. The diaphragm 44, in turn, is supported at its periphery by an upstanding annular base 46 seated on the upper surface of the block 36, in a concentric relationship with the annular base 42 of the throttle cone 34, as well as the riser 40. The diaphragm 44 is sufficiently flexible to accommodate displacement of the throttle cone 34, relative to the riser 40, in axial directions and is coupled to the throttle cone 34 in any convenient manner. As illustrated, FIG. 3, the cone 34 is mounted on the diaphragm and supported at an annular shoulder 48 immediately adjacent to the base 42. Thus, the diaphragm 44 engages the base 42 of the throttle cone 34. In practice, the base 42 of the cone 34 is extended through an appropriately formed opening 50 provided in the center of the diaphragm 44.

Internally, the throttle cone 34 is provided with a throttling surface 52 of an inverted frusto-conical configuration inclined toward the bore 43 and communicating therewith. Thus, the cone communicates with the uppermost end of the riser 40. As a practical matter, the throttling surface 52 of the throttling cone 34 is configured to receive in a mated relationship an adjacent throttling surface 54 of the plug 32, also of a frusto-conical configuration. In practice, the surfaces 52 and 54 are commonly configured and are inclined at a relatively small angle of inclination relative to the longitudinal axis of the plug 32. This inclination requires that substantial axial displacement be imparted to the plug 32 in order to achieve a substantial change in the spacing between the throttling surfaces 52 and 54. Thus, as can be appreciated, a "fine throttling" capability is imparted to the valve 10.

As should be apparent, the flexible diaphragm 44 assures that axial motion imparted to the plug 32 is not inhibited as a consequence of an engagement of the throttling surfaces 52 and 54. Furthermore, in view of the fact the diaphragm 44, in effect, permits the cone 34 to retreat as the surface 54 of the plug 32 is advanced into engagement with the surface 52 of the cone 34, axial alignment of the plug is not disturbed as a consequence of such engagement.

As a practical matter, the plug 32 and the cone 34 are so interrelated that at no time during the valve's operation is the plug 32 totally extracted from the cone 34. Therefore, the uppermost or distal end of the throttle cone 34 is provided with an annular array of castellations 56 which separate an array of uniformly configured slots 57. The purpose of the array of slots 57 is to accommodate an accelerated flow rate through the control unit, as the throttling surface 54 of the plug 32 is retracted relative to the throttling surface 52 of the throttle cone 34, once the valve is caused to conform to its full-flow configuration.

The distal end of the plug 32, immediately adjacent the throttling surface 54, is provided with a shut-off ball 60 configured to be received by an annular ball seat 62. The ball 60, of course, can be shaped to any configuration consistent with the known principles of valve design. However, a hemispheric configuration has, in operation, proven to be quite satisfactory. The ball 60 is integral with the plug 32 and the ball seat 62 preferably is a so-called circular line seat which circumscribes the uppermost end of the bore 38. As herein employed, the term circular line seat is intended to mean an annular seat having substantially no thickness, formed in a plane orthogonally intersecting the bore 38. By employing a circular line seat, a leak-tight seal readily can be established between the hemispheric surface of the shut-off ball 60 and the seat. Thus, a leak-tight shut-off is assured when the valve 10 is in its closed configuration.

In order to impart reciprocatory motion to the plug 32 the plug is mounted at the distal end of an actuating shaft 64, which, in turn, is supported for retilinear reciprocation within a guide collar 66. The collar 66 is provided as a bore, formed within the housing 12 in coaxial alignment with the bore 38. It will therefore be appreciated that as the shaft 64 is driven in rectilinear displacement the plug 32 is advanced and retracted, relative to the throttle cone 34.

While any suitable drive mechanism can be employed for imparting rectilinear motion to the shaft 64, an actuator 70 which includes a boot shrouded, manually operable jackscrew, serves quite satisfactorily for this purpose.

It should be apparent that the plug 32, the cone 34 and the bore 38 can be varied to accommodate a very wide range of flow characteristics. Therefore, a detailed analysis of the flow characteristics is omitted in the interest of brevity.

OPERATION

It is believed that in view of the foregoing description, the operation of the device will be readily understood and it will be briefly reviewed at this point.

With the valve 10 assembled in the manner hereinbefore described, and coupled between the conduits 18 and 20, the valve 10 has the unique capability of achieving a leak-tight shut-off, precise throttle control, while assuring that substantially no pressure drop across the valve occurs when the valve is in its open or full flow configuration.

Initially, the actuator 70 is activated in an appropriate manner for assuring that the ball 60 is seated on the circular line ball seat 62 and that the surfaces 52 and 54 are engaged. When the ball 60 is so seated, a substantially leak-tight seal is effected between the seat and the ball. In order to initiate a flow of fluid through the housing 12, the actuator 70 is activated in a manner such that the plug 32 is moved in an axial direction for removing the ball 60 from the seat 62 whereby the seal is interrupted. Of course, displacement of the plug 32 away from the seat 62 causes the throttling surface 54 of the plug 32 to disengage the throttling surface 54 of the throttle cone 34. Since the angle of inclination of the throttling surfaces, relative to the longitudinal axis of the plug 32, is relatively slight, substantial movement of the plug 32 is required before a substantial flow of fluid between the surfaces 52 and 54 is established. Hence, substantial motion of the plug 32 must occur in order to substantially vary the flow rate of the fluid through the valve. Thus a fine throttling capability is imparted to the valve. Continued displacement of the plug 32, however, permits the throttling surface 54 to be extracted through the throttling cone 34 a distance such that the space 57 between the castellations of the array of castellations 56 are substantially unobstructed. At this instant, the flow rate through the valve is greatly increased even though the plug 32 has not been totally extracted from the cone 34.

When desired, the valve 10 is closed in a reverse manner, simply by advancing the plug 32 toward the ball seat 62 for reseating the ball 60 on the ball seat. As the plug 32 is advanced into the cone 34, the adjacent conical surfaces 52 and 54 guide the ball 60 toward the ball seat. However, in the event the plug 32 becomes misaligned, due to temperature changes or for any reason, the plug 32 engages the cone 34 whereupon the disk-shaped diaphragm 44 is caused to flex to accommodate such misalignment by permitting the cone to move along the riser 40 so that the ball 60 is permitted to advance toward the ball seat 62. Thus, the curved surface of the shut-off ball 60 is permitted to reseat on the circular line seat 62 for thereby achieving a leak-tight, metal-to-metal seal.

In view of the foregoing, it is to be understood that the valve 10 of the instant invention provides a practical solution of the perplexing problem of providing a valve for controlling the flow of high-temperature liquids which, when in its shut-off configuration, establishes substantially complete interruption of the flow, when in its throttling configuration accommodates a substantially precise control over the rate of flow through the valve, and when its fully opened configuration accommodates a flow with a substantially negligible pressure drop curring across the valve.

Although the invention has been herein shown and described in what is conceived to be the most practical and preferred embodiment, it is recognized that departures may be made therefrom with the scope of the ivention, which is not to be limited to the illustrative details disclosed.

What is claimed is:

1. A flow-control valve for a flowing body of fluid comprising:
    A. a housing having means defining therein a fluid intake port and a fluid discharge port arranged in a mutually spaced relationship;
    B. means defining within said housing a fluid passageway for conducting a flow body of fluid between said ports; and
    C. a flow-control unit interposed within said passageway including,
        1. means defining a tubular conduit having a valve seat defined about one end thereof, said seat being rigidly supported against axial displacement,
        2. a metallic throttling cone having an internal surface conforming to a frusto-conical configuration coaxially related to said valve seat,
        3. means including a flexible disk supporting said cone for rectilinear movement,
        4. an axially reciprocable plug supported in coaxial relation with said cone, including means defining a truncated conical surface circumscribing an end portion of said plug and configured to be received and mated with the internal surface of said throttling cone for regulating the rate of flow of said body, and means defining at the distal end of the plug a curved surface adapted to pass through said cone into sealing engagement with said seat for interrupting the flow of said body, and
        5. means for imparting rectilinear reciprocation to said plug, whereby flow-control is imposed on said flowing body of fluid.

2. The valve of claim 1 wherein said tubular conduit terminates in a planar surface and said seat is a circular line seat circumscribing the center portion of said surface.

3. The valve of claim 2 wherein said seat lies substantially within the plane of said surface and said curved surface is of a hemispherical configuration.

4. The valve of claim 3 wherein the distal end of said cone is circumscribed by an annular array of castellations.

5. The valve of claim 4 wherein said housing and said tubular conduit are fabricated from refractory metal.

6. In a flow control valve for precisely controlling a flow of high temperature fluids, the improvement comprising:

A. a flow control unit including an elongated tubular conduit having a transverse end surface of planar configuration and an internal surface of a cylindrical configuration terminating in a plane coincident with the plane of said transverse end surface and defining a circular line valve seat at the termination thereof;

B. an axially reciprocable throttle plug coaxially aligned with said circular line valve seat having a distal end portion terminating in a sealing surface of a hemispherical configuration for mating with said circular line valve seat as selected axial motion is imparted to the plug, and a throttling surface of a frusto-conical configuration circumscribing the end portion of said plug adjacent to said sealing surface;

C. a throttling cone interposed in coaxial alignment between said valve seat and said sealing surface, formed of a rigid material and having an internal surface of a frusto-conical configuration for concentrically mating with said throttling surface as said selected axial motion is imparted to the plug, and a resilient, metallic disk supporting said throttling cone for axial displacement imparted thereto in response to said axial motion imparted to said plug, for accommodating a mating of the sealing surface with said circular line valve seat; and C. means for imparting selected axial motion to said plug.

7. The improvement of claim 6 further comprising means defining within said throttling cone an annular array of uniformly configured slots.

* * * * *